United States Patent [19]
Atchley

[11] Patent Number: 5,327,287
[45] Date of Patent: Jul. 5, 1994

[54] LIGHT INTENSIFYING DEVICE

[76] Inventor: Curtis L. Atchley, 7531 Oriental Trail, San Antonio, Tex. 78244

[21] Appl. No.: 34,111

[22] Filed: Mar. 22, 1993

[51] Int. Cl.⁵ .............................................. G02B 21/10
[52] U.S. Cl. .................................. 359/599; 359/559; 359/859; 359/894; 354/295
[58] Field of Search ............... 359/559, 599, 859, 894, 359/597; 354/295; 250/216

[56] References Cited

U.S. PATENT DOCUMENTS

| | | | |
|---|---|---|---|
| 585,770 | 7/1897 | Lugrin | 359/597 |
| 668,404 | 2/1901 | Hanneborg | 359/597 |
| 2,809,554 | 10/1957 | Bernhardt | 88/39 |
| 3,423,593 | 1/1969 | Chinnock | 250/208 |
| 3,744,872 | 7/1973 | Akin, Jr. et al. | 350/36 |
| 4,127,318 | 11/1978 | Determann et al. | 350/91 |
| 4,186,993 | 2/1980 | Shimizu et al. | 350/91 |
| 4,351,584 | 9/1982 | Chandesasis | 350/89 |
| 4,475,796 | 10/1984 | Kimura | 350/525 |
| 4,556,292 | 12/1985 | Mathyssek et al. | 350/394 |
| 4,556,312 | 12/1985 | Vany | 355/47 |
| 4,659,193 | 4/1987 | Nagano | 350/525 |

*Primary Examiner*—Eugene R. LaRoche
*Assistant Examiner*—Tan Nguyen

[57] ABSTRACT

A light intensifying device for use with cameras, telescopes, and other optical devices. The lightweight device can be easily manufactured and assembled from molded components of high durability plastic. When used as an attachment with cameras or telescopes the device will provide greater quantities of of light to allow for greater magnification and better image resolution for distant objects. The device will double the amount of light and can be used in conjunction with a camera focal length doubler which doubles the focal length but decreases the light by one half.

6 Claims, 6 Drawing Sheets

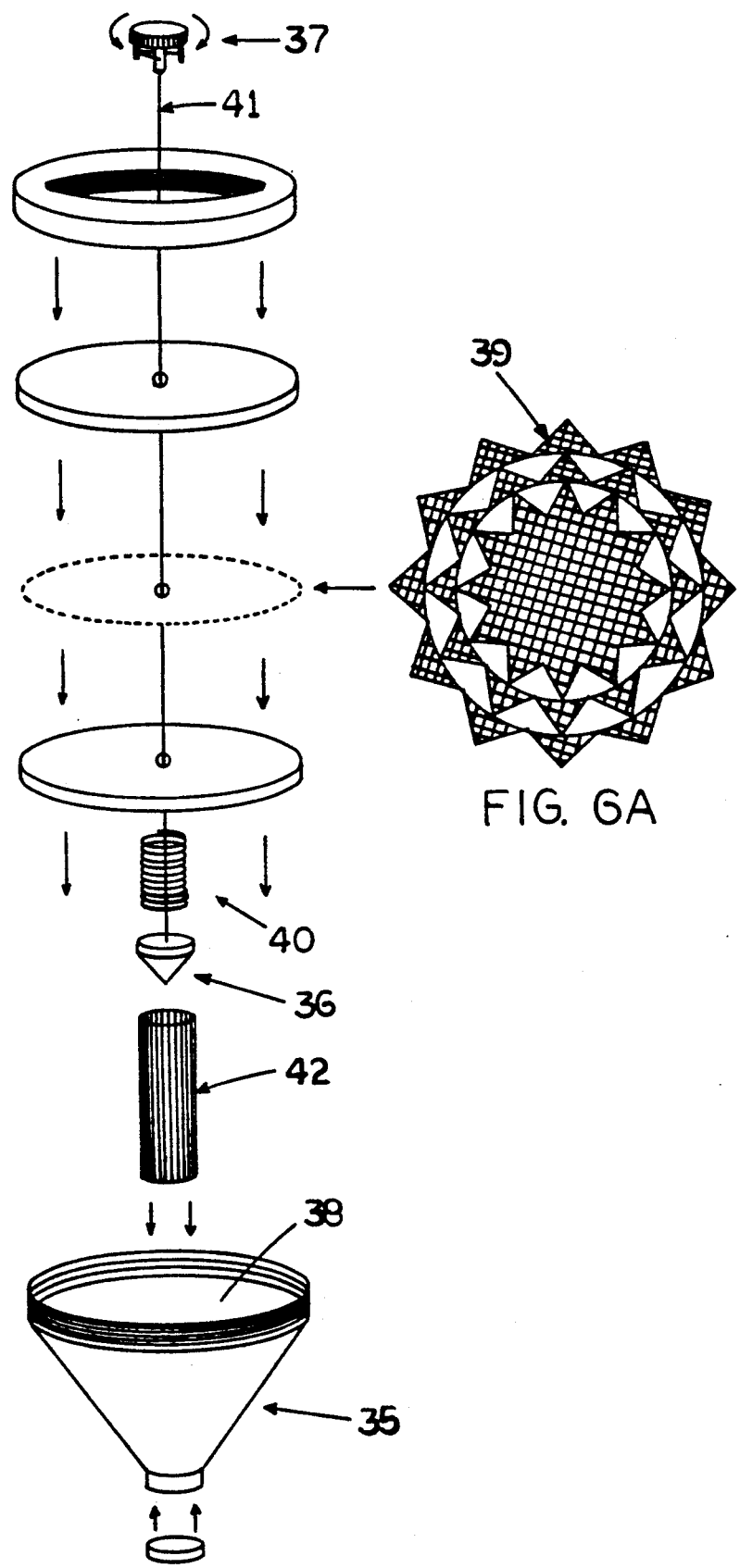

LIGHT INTENSIFYING DEVICE

BACKGROUND OF THE INVENTION

1. Field of The Invention

The present invention relates generally to light intensifying devices.

2. Background Information

This invention relates to a light intensifying device to be used as an attachment with cameras, telescopes, and other optical devices. It is well known in the art that the amount of available light received by a camera or telescope is a critical factor in photography or telescopic viewing. Greater light allows for greater magnification in all optical instruments without loss of image resolution. Cameras and telescopes employ larger light gathering lenses when greater magnification is desired for distant objects. These larger lenses are generally expensive, heavy, and are awkward to use.

The state of the art teaches light intensifying devices for microscopes to improve their image quality and resolution. These devices work well with microscopes but cannot be used as light intensifyers for cameras or telescopes. The light intensifying device taught by this invention for cameras and telescopes is not disclosed or made obvious by any Prior Art.

BRIEF SUMMARY OF THE INVENTION

It is an object of the present invention to provide a light intensifying device which can be used as an attachment to cameras or telescopes whenever greater quantities of light are needed to allow for greater magnification and better image resolution for distant objects or darker conditions. It is a further object of this invention to provide a very lightweight and inexpensive device which will provide good image quality and uniform intensity which is free of distortion.

For this purpose, this invention comprises a device which is made of lightweight molded or fabricated materials having parts which are assembled as shown in the drawings.

BRIEF DESCRIPTION OF DRAWINGS

FIG. 1A is a top view of the light blocking pattern which is used when doubling the light.

FIG. 6 is a perspective view of an assembled light intensifying device which can be used to vary the light intensity by controling the position of the inner 45 degree reflective conic component in relation to the outer 45 degree reflective conic section and the light blocking pattern.

FIG. 6A is a top view of a light blocking pattern which will produce three levels of light intensity in conjunction with the position of the inner 45 degree reflective conic component.

DETAILED DESCRIPTION OF THE INVENTION

Figure 1:
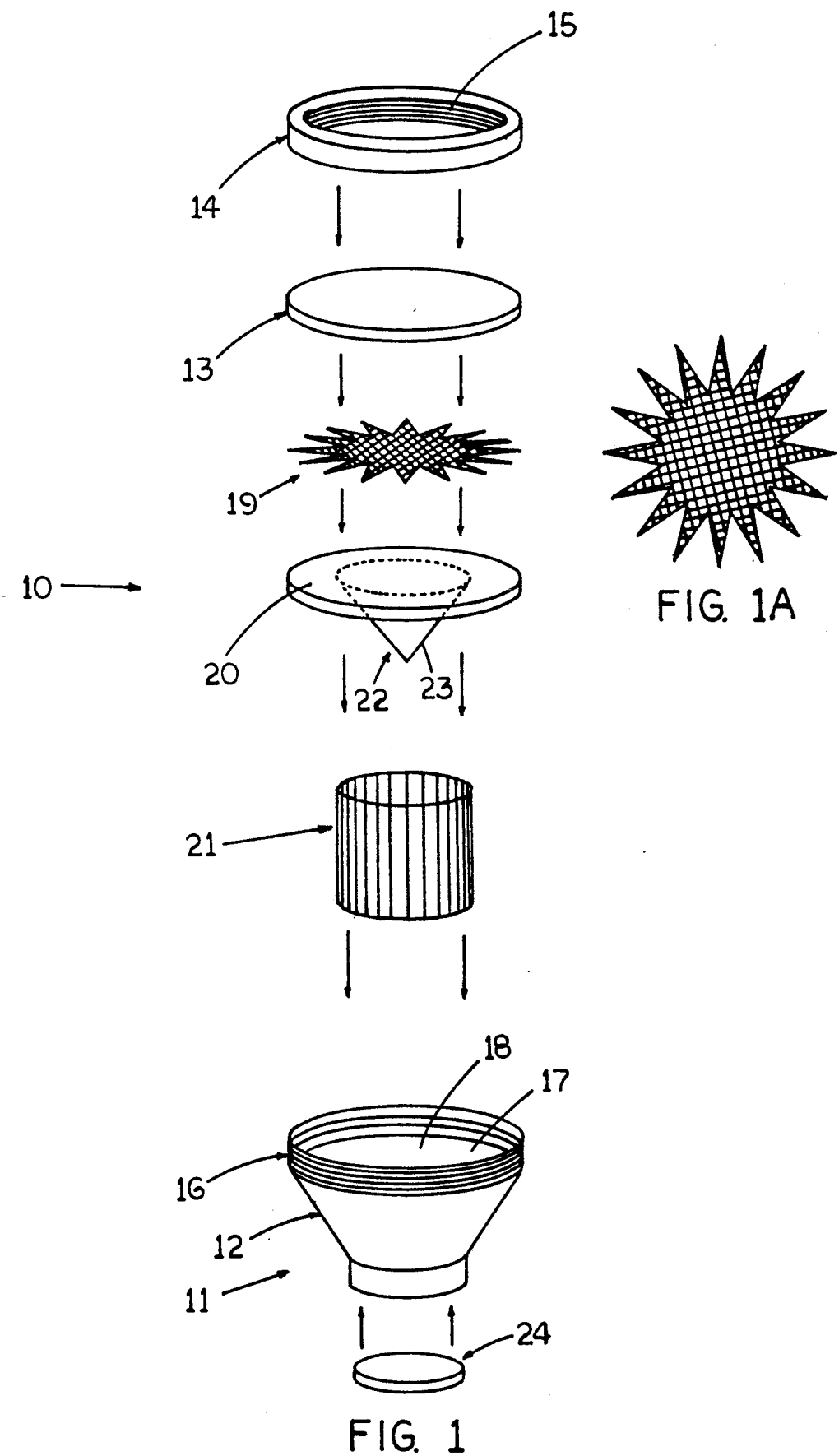
FIG. 1 is a perspective view of the assembled light intensifying device which will essentially double the light.

Referring to FIG. 1, the light intensifying and doubling device(10) is shown with its component parts as they are to be assembled. The housing body(11) has a conic shape(12) which is formed at a 45 degree angle and can be molded from various materials. The smooth interior conic surface(17) is covered with a reflective coating(18) to reflect all incoming light which passes through the light transparent cover(13), light blocking pattern(19), and transparent outer ring(20). The light which is reflected from the reflective coating(18) is then passed through a transparent diffuser(21) to spread the light uniformly over the inner reflective cone(22). The smooth inner cone(22) is covered with a reflective coating(23) which reflects the light through the bottom light transparent cover(24). The housing body(11) is made to contain the other parts which can be easily assembled and secured in place by light transparent cover(13) and the outer support ring(14) whose inner threads(15) are made to match the outer threads(16) of the housing body(11).

FIG. 1A provides a top view of the light blocking pattern(19) which is used for a light doubling device. The light blocking pattern(19) can be made from a variety of non-transparent materials as a separate part as shown or it can be painted or etched onto the upper surface of the transparent ring(20) or the bottom surface of the light transparent cover(13) and alignment of the light blocking pattern(19) with the transparent diffuser(21) is critical for proper operation of the light intensifying device(10). The light blocking pattern(19) is required to prevent the increase in light intensity as it is projected on the inner reflective cone(22). The light blocking pattern(19) is derived from an inverse plot of the intensity increase on the inner reflective cone(22). The light blocking pattern(19) will produce a good quality image with doubled intensity as the light is spread by the transparent diffuser(21) onto the inner reflective cone(22).

Figure 2:
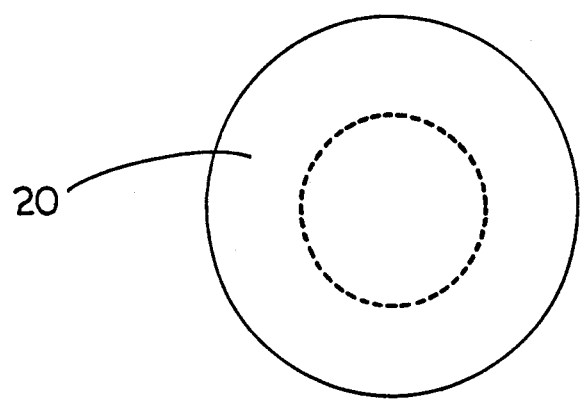
FIG. 2 is a top view of a part which has a transparent outer ring with a central 45 degree reflective conic component which is used to reflect the light.
Figure 2A:
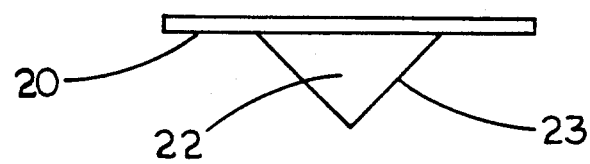
FIG. 2A is a side view of a part which has a transparent outer ring with a central 45 degree reflective conic component which is used to reflect the light.
Figure 2B:
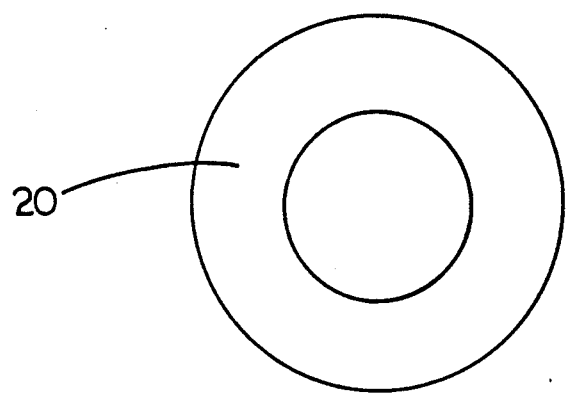
FIG. 2B is a bottom view of a part which has a transparent outer ring with a central 45 degree reflective conic component which is used to reflect the light.

FIGS. 2, 2A, and 2B, provides a top, side, and bottom view of transparent outer ring(20), inner reflective cone(22), and inner cone reflective surface coating(23). This part is used to support the light blocking pattern(19), transmit light through its outer ring, and to center the inner reflective cone(22) within the housing body(11).

Figure 3:
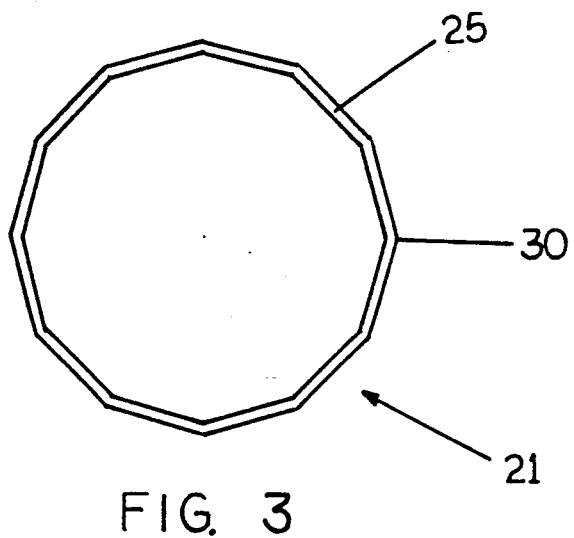
FIG. 3 is a top view of the diffuser which spreads the partially blocked light uniformly onto the central 45 degree reflective conic component.
Figure 3A:
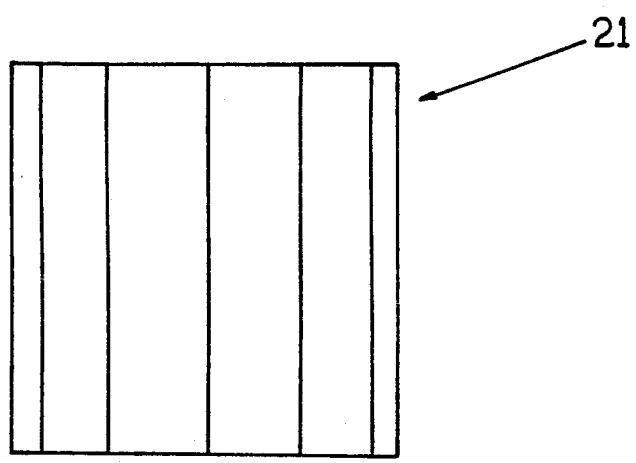
FIG. 3A is a side view of the diffuser which spreads the partially blocked light uniformly onto the central 45 degree reflective conic component.

FIGS. 3 and 3A provides a top and side view of the transparent diffuser(21) which is used to spread the light uniformly onto the inner reflective cone(22). The transparent diffuser(21) is made to have the same number of faces as the number of spaces between the points of the light blocking pattern(19). When assembled the transparent faces of the transparent diffuser(21) will be aligned with the light blocking pattern(19) to project a uniform image of equal intensity onto the inner reflective cone(22). The wall thickness(25) and refractive index of the transparent diffuser(21) can be adjusted to accomplish the uniform spreading of light on the inner reflective cone(22).

Figure 4:
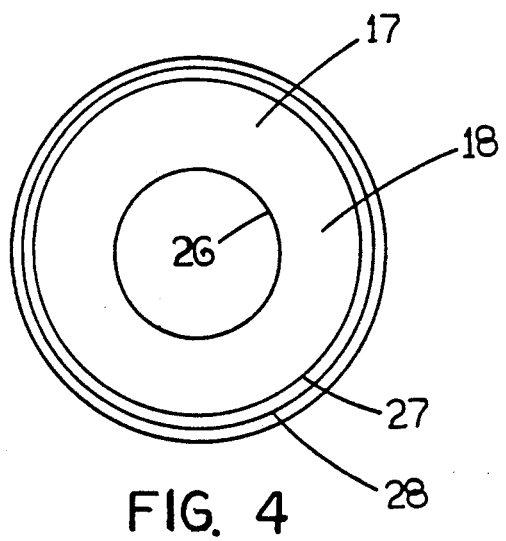
FIG. 4 is a top view of the housing body which has an inner 45 degree reflective conic section and is made to contain and support all of the component parts of the light intensifying device.
Figure 4A:
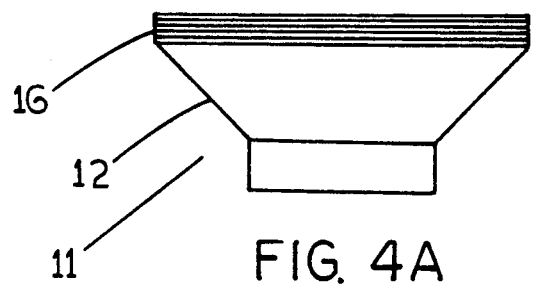
FIG. 4A is a side view of the housing body which has an inner 45 degree reflective conic section and is made to contain and support all of the component parts of the light intensifying device.
Figure 4B:
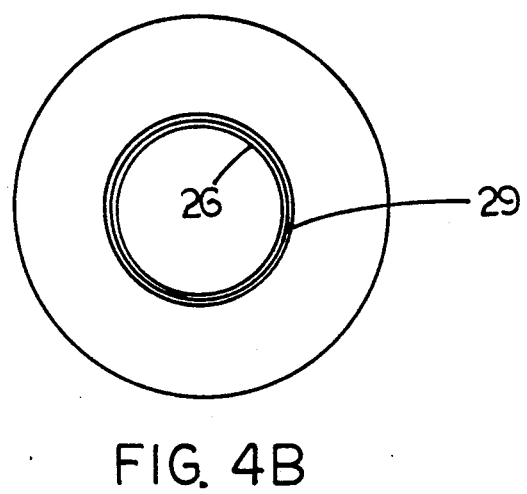
FIG. 4B is a bottom view of the housing body which has an inner 45 degree reflective conic section and is made to contain and support all of the component parts of the light intensifying device.

FIGS. 4, 4A & 4B provides a top, side, and bottom view of the housing body(11). The outer edge points(30) of the transparent diffuser (21) are made to fit exactly into the central hole(26) of the housing body(11). The light blocking pattern(19) and the transparent outer ring(20) have the same diameter and are made to fit exactly into the recessed portion(27) of the housing body(11). The combined thickness(31) of the light blocking pattern(19) and the transparent outer ring(20) are made to match exactly the depth of the recessed portion(27) of the housing body(11). The light transparent cover(13) is made to match the width and depth of the recessed portion(28). The bottom light transparent cover(24) is made to fit snugly into the recessed portion(29) of the housing body(11).

Figure 5:
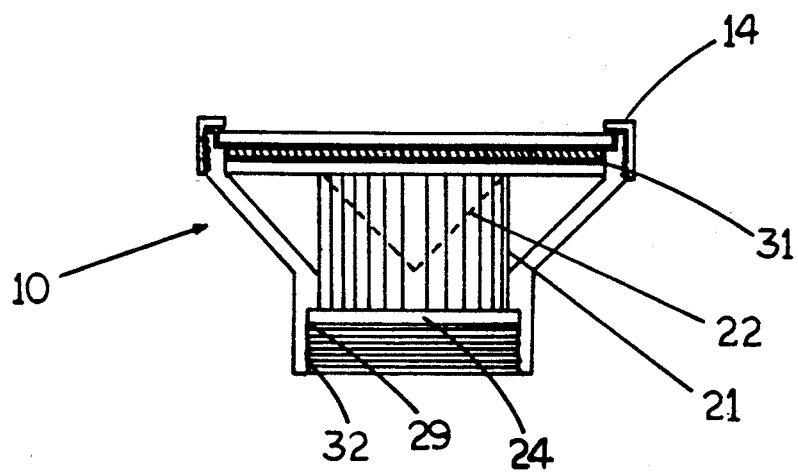
FIG. 5 is a cross-section of an assembled light doubling device which can be used with a camera as shown.
Figure 5A:
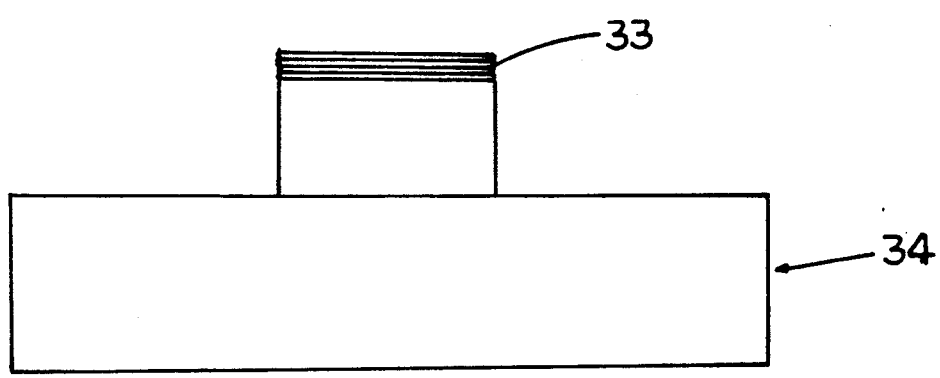
FIG. 5A is a camera.

FIG. 5 is a cross-section of the assembled light intensifying and doubling device(10). The inner threaded portion(32) is made to match the outer threaded portion(33) of a typical camera(34).

FIG. 6 is another embodiment of the invention which employs a larger housing body(35) to inner 45 degree reflective cone(36) relationship and has the capability of providing three different levels of light intensity. The inner 45 degree reflective cone(36) is adjusted by the control knob(37) to a position in relation to the outer 45 degree reflective conic section (38) and the light blocking pattern(39) to select one of the three levels of light intensity. The control knob (37) and spring(40) are connected by wire(41) to facilitate movement of the inner 45 degree reflective cone(36) within the transparent diffuser(42) to a position which will provide the selected level of light intensity. This embodiment could be expanded to provide many additional levels of light intensity and would fall within the bounds of this invention.

I claim:

1. A light intensifying device, comprising:

A housing means with an interior 45 degree conic sectional reflective surface which is made to contain and support all assembled parts of the device and is made to connect in some manner to a camera, telescope, or other optical device;

A light blocking means which blocks a portion of the incoming light in a manner that will produce an image of uniform intensity as the light passes through the remaining elements of the device;

A light diffusing means that spreads the light in a manner that will produce an image of uniform intensity as the light passes through the device;

A cone shaped reflective means that is centered within the housing body and light diffuser to receive the light which has passed through the device and reflect a complete image of uniform intensity to a camera, telescope, or other optical device;

An upper cover means that will hold the component parts in place and prevent water and dust from entering the device;

A lower cover means that will hold the light diffuser in place and prevent water and dust from entering the device.

2. The apparatus of claim 1 wherein said light diffusing means comprises a transparent cylindrically shaped multi-sided object;

said cylindrically shaped multi-sided object has multiple parallel exterior and interior sides which run the length of cylinder from top to bottom;

said multiple interior and exterior sides are assembled to be in perfect alignment with the light blocking pattern for proper operation of the light intensifying device;

said alignment is achieved by alignment of each outer corner of said cylindrically shaped multi-sided object with each outer point of the light blocking pattern;

said cylindrically shaped multi-sided object having the same number of outer corners as outer points of the light blocking pattern.

3. The apparatus of claim 1 wherein said light blocking means comprises a pattern disposed between the light transparent cover and the transparent outer ring as a thin non-transparent part or as a non-transparent painted or etched pattern on the under side of the light transparent cover or on the top side of the transparent outer ring;

said light blocking pattern will prevent an intensity increase on the inner reflective cone as light passes through the device and will result in an image of uniform light intensity.

4. The apparatus of claim 1 wherein said upper cover means comprises a light transparent protective cover that will transmit incoming light, hold the component parts in place, and will prevent water and dust from entering the device.

5. The apparatus of claim 1 wherein said lower cover means comprises a light transparent protective cover that will transmit incoming light, hold the light diffuser in place, and is needed to prevent water and dust from entering the device if the light intensifying device is not permanently attached to an optical instrument.

6. The apparatus of claim 1 further comprising a light intensifying device having an adjustable inner reflective cone which is detached from the transparent outer ring and a variable blocking pattern to provide additional light intensity levels.

* * * * *